(12) United States Patent
Feyerabend et al.

(10) Patent No.: US 11,392,804 B2
(45) Date of Patent: Jul. 19, 2022

(54) DEVICE AND METHOD FOR GENERATING LABEL OBJECTS FOR THE SURROUNDINGS OF A VEHICLE

(71) Applicant: Robert Bosch GmbH, Stuttgart (DE)

(72) Inventors: Achim Feyerabend, Heilbronn (DE); Elena Pancera, Ilsfeld (DE); Heinz Hertlein, Erlenbach (DE); Oliver Pink, Ditzingen (DE); Thomas Goeppel, Obersulm-Affaltrach (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 16/692,082

(22) Filed: Nov. 22, 2019

(65) Prior Publication Data

US 2020/0175342 A1    Jun. 4, 2020

(30) Foreign Application Priority Data

Dec. 4, 2018   (DE) ..................... 102018220892.1

(51) Int. Cl.
*G06K 9/62* (2022.01)
*G05D 1/00* (2006.01)
(Continued)

(52) U.S. Cl.
CPC ......... *G06K 9/6278* (2013.01); *G05D 1/0088* (2013.01); *G06K 9/6259* (2013.01); *G06V 20/58* (2022.01); *G05D 2201/0213* (2013.01)

(58) Field of Classification Search
None
See application file for complete search history.

(56) References Cited

U.S. PATENT DOCUMENTS 10,275,689 B1 * 4/2019 Sachdeva ................ G06T 15/20
2008/0120077 A1    5/2008 Lee et al.
(Continued)

FOREIGN PATENT DOCUMENTS

CN     101499178 A  *  8/2009  .......... G06K 9/6218
CN     109125286 A  *  1/2019  .......... A61K 31/713
(Continued)

OTHER PUBLICATIONS

Klassification Methods, Wikipedia article with English translation, obtained from https://de.wikipedia.org/wiki/Klassifikationsverfahren, last updated Apr. 11, 2019.
(Continued)

*Primary Examiner* — Mohammed Rachedine
(74) *Attorney, Agent, or Firm* — Norton Rose Fulbright US LLP; Gerard Messina

(57) ABSTRACT

A method and a labeling system for generating a label object for the symbolic description of an object of an environment of a mobile device, e.g., a robot or a vehicle. The label object includes at least one attribute of an object at a first point in time, from observations of this object. The method includes selecting, from the observations, a first observation recorded at a first point in time, a second observation recorded at a second point in time, the second point in time being a point in time before the first point in time, as well as a third observation recorded at a third point in time, the third point in time being a point in time after the first point in time; and ascertaining, by using the selected observations, the at least one attribute of the object.

19 Claims, 6 Drawing Sheets

(51) Int. Cl.
*G06V 20/58* (2022.01)
*G06V 10/94* (2022.01)
*G06V 20/56* (2022.01)

(56) References Cited

U.S. PATENT DOCUMENTS

2016/0252905 A1* 9/2016 Tian .................. G06V 20/584
                                                    701/23
2020/0089942 A1* 3/2020 Man ..................... G06V 40/20
2020/0175718 A1* 6/2020 Viswanathan ....... G06V 20/584

FOREIGN PATENT DOCUMENTS

DE      102016205139 A1    3/2017
WO   WO-2020243484 A1 * 12/2020  ...... B60W 30/18154

OTHER PUBLICATIONS

Nageswaran, Ganesh: Dissertation "Integrated Multi-Object Tracking and Classifications for Vehicle Environment Perception", Appendix A, pp. 133-137 (2017).

* cited by examiner

DEVICE AND METHOD FOR GENERATING LABEL OBJECTS FOR THE SURROUNDINGS OF A VEHICLE

CROSS REFERENCE

The present application claims the benefit under 35 U.S.C. § 119 of German Patent Application No. DE 102018220892.1 filed on Dec. 4, 2018, which is expressly incorporated herein by reference in its entirety.

FIELD

The present invention relates to a method and a labeling system for generating a label object for the symbolic description of an object of an environment, or a surroundings, of a mobile device, e.g., a robot or a vehicle, in particular of a mobile device that is movable at least partially in automated fashion. The present invention furthermore relates to a program element, a computer-readable medium and a use.

BACKGROUND INFORMATION

For a mobile device, e.g., for a robot or a vehicle, a symbolic description of an object, or a plurality of objects, of an environment or a surroundings of the mobile device may be important. For the symbolic description of the object, the object is recorded, e.g., by a camera and is provided with attributes, e.g., by human personnel, e.g., on the basis of image data of the surroundings of the vehicle. For example, a first detected object may be attributed as a "housing having a specific color," or a second detected object may be attributed as "vehicle having a specific velocity." This process is also called "labeling" the object. The detected and "labeled" object may be called a "label object." These manual methods may be expensive in terms of time and costs, however.

SUMMARY

One aspect of the present invention relates to a method for generating a label object, which comprises at least one attribute of an object at a first point in time, from observations of this object, including the steps:
selecting, from the observations,
a first observation made at the first point in time, a second observation recorded at a second point in time, the second point in time being a point in time prior to the first point in time, and
a third observation recorded at a third point in time, the third point in time being a point in time after the first point in time;
ascertaining, by using the selected observations, e.g., via a labeling module, the at least one attribute of the object.

The label object links an observation to a label. A label comprises a symbolic, in particular time-dependent, description of the static and/or dynamic object. The label object may be regarded as a representation of an object in a surroundings of a mobile device, e.g., a robot or a vehicle driving at least partially in automated fashion. An object of the surroundings, i.e., of the "real world" as it were, may be for example a house, a tree, another vehicle, a roadway, a guardrail and/or another object. An attribute may be, e.g., "house," "tree," "vehicle"; the attribute may comprise, e.g., a color and/or the attribute "static" or "dynamic" label object. Furthermore, labels may also refer to regulatory elements such as, e.g., access restrictions or speed limits.

Static labels describe the static objects with their attributes. A static object is an object having a velocity of zero, e.g., a house, a tree, a guardrail, a traffic sign, a landmark or a so-called ground plane (drivable or non-drivable ground profile). A dynamic or movable object may have a velocity other than zero, e.g., other road users such as persons or other vehicles. The dynamic object may have time-dependent states; it may be described by trajectories for example. The labels of the dynamic objects describe the dynamic objects with their attributes, for example position, velocity, acceleration, orientation, etc. A dynamic object may be another object in a space, e.g., another road user, for example a person P at a location s (e.g., in x/y coordinates), having velocity v, acceleration a and orientation w.

A robot may be, e.g., a snow removal vehicle, a lawnmower, an farm machine. A vehicle may be a land vehicle, it may be in particular a passenger car, a delivery van, a truck, a land-bound specialist vehicle or an amphibious vehicle.

The observations may have been recorded for example by one or several sensors. The sensor(s) may be of one sensor type or of several sensor types or may use different or identical contrast mechanisms, for example from a camera and/or from a radar sensor. The sensors may be in particular sensors of a mobile device. The object is detected by the sensor and is stored as the observation, e.g., in a memory of a control system. The memory may be situated in the mobile device, e.g., within the robot or vehicle, the memory may be situated outside of the mobile device—e.g., on a server or another vehicle—or may also be distributed over multiple memories within and outside of the mobile device. In this memory, the recorded surroundings of the mobile device, e.g., an ego vehicle, may be stored as a sequence of observations, it being possible to store different attributes depending on the utilized sensor modality. Each element of the sequence of observations may have a time stamp. In the case of a camera, the observation may be stored, e.g., unprocessed as a raw image or following a preprocessing, e.g., using a rectifier.

The observation comprises at least a first observation, a second observation and a third observation. The first observation is made at a first point in time. The first point in time may be, e.g., the real present time. The first point in time may be, in particular in offline processing, e.g., using a plurality of observations, a point in time that is prior to the real present time and that was stored, e.g., in the form of a file. The first point in time may be in this case defined as a reference point in time—so to speak as the "present time for this measurement," i.e, during the recording of the object.

The second point in time is a point in time prior to the first point in time, that is, it is in the past with respect to the first observation. The second point in time may be days, hours, minutes, seconds or only a fraction of a second prior to the first point in time. The second point in time may be—e.g., in the case of a camera and/or a radar sensor, that is, in devices that are able to record several images per second—the point in time at which the predecessor "image" was taken. It may also be a sequence of images, i.e., the second point in time may comprise multiple points in time.

The third point in time is a point in time after the first point in time, i.e., the third point in time is in the future with respect to the first observation. If the first point in time is e.g., in the real present time, then the third observation may be made for example by a prediction system. In the case of offline processing, e.g., with a plurality of observations, this may be a later point in time in comparison to the first point in time. The third point in time may be days, hours, minutes, seconds or only a fraction of a second after the first point in time. The third point in time may be removed from the first point in time by the same time interval as the second point in time. The third point in time may comprise multiple points in time and may comprise, e.g., a sequence of points in time. The points in time may have equidistant, dynamically configured and/or dynamically configurable time intervals.

The labeling module ascertains the at least one attribute of the object by using the selected observations. The observation or the plurality of observations is occasionally referred to as an unlabeled sample. The observation or the plurality of observations having respectively at least one attribute is at times referred to as a labeled sample. The labeled sample thus denotes a plurality of recorded or stored observations. The labeled sample may comprise a symbolic description of the vehicle surroundings. This ascertainment of attributes may occur, e.g., in that a single or a plurality of object attributes (labels) are added to the plurality of observations. This makes it possible to generate symbolic, abstracted attributes of the objects. For this purpose, the labeling module determines the objects and their attributes, for example in that the observations are processed using one or multiple pattern detection algorithms and multi-target tracking algorithms. The ascertainment uses the first observation, the second observation and the third observation, that is, it considers, so to speak, the present, the past and the future of the observation. This is sometimes called a holistic processing of the observation. In holistic processing, the labels belonging to a specific point in time are generated automatically in that observations are used prior to, at and following this point in time. The holistic processing of the observation is able to achieve a particularly high precision and reliability of the labels. It has been shown in particular that the achievable accuracy and reliability of the labels generated in this manner is in many cases higher than when using other algorithmic methods, which only take into account the observation prior to and at the point in time of the detection, but not after that point in time, as is the case in the present invention.

The labels are also called reference labels or ground-truth labels. The labels refer to one or more objects in a surroundings, i.e., in the real world. The object (or the objects) may be a static object or a dynamic object. The reference labels or ground-truth labels may be used for example for training devices that use machine learning methods.

The method may be used for offline labeling, but also for online labeling. A variant could be used for online labeling that takes into account specifics of online processing and/or processing in mobile devices, e.g., a network-independent robot or a vehicle, such as, e.g., limited computing time and/or storage space.

In one specific example embodiment of the present invention, each of the observations is made up of individual observations, in particular of a plurality of individual observations, and these individual observations are respectively recorded using different contrast mechanisms. The individual observations may be recorded for example by a plurality of sensors or individual sensors. The different contrast mechanisms may be recorded for example using different types of sensors. An observation, which uses a plurality of sensor types, is sometimes called "multimodal." The different contrast mechanisms may be recorded, e.g., using the same sensor type that has a different kind of preprocessing and/or postprocessing. Examples may be different attachment elements, in cameras, e.g., different lenses, or different filters and/or algorithms for postprocessing. These may be used to perform, e.g., sensor modality-specific measurement such as for example pixel values, position measurement, measurements of velocity components, etc.

These individual observations may also be recorded using the same contrast mechanism and using sensor of different qualitative value. For example, it is possible to use standard sensors together with so-called reference sensors. A reference sensor may have a higher quality, e.g., with respect to a greater signal-to-noise ratio, a greater imaging accuracy and/or a greater resolution in space or time. The reference sensor may be a calibrated sensor. This may be one or multiple sensors, which are situated in the vehicle or in connection with the vehicle in addition to the—in one specific embodiment multimodal—sensors, which are used for the automated driving functions. These additional reference sensors may improve the accuracy of the holistically generated labels, in that the additional sensor data are amalgamated with the data of the standard sensor set. The reference sensors have an accuracy and a range that is at least just as good, in some cased decidedly better, than the accuracy and/or range of the standard sensor set. The reference sensors may be used for checking the standard sensors.

In one specific example embodiment, the individual observations are amalgamated to form the observations before these observations in turn are used for ascertaining the attribute of the object. For this purpose, the data of different sensors and/or different sensor types are amalgamated. For example, the data provided by a camera and a radar sensor may be semantically combined in such a way that they are associated with the same object so that the estimation of the attributes of this object is based on information of the different sensors. The labels, which define the objects, may be used for each individual sensor of the multimodal sensors (such as for example radar, lidar or camera data) or also for a combination of several sensor types. This may be utilized for applications such as for example evaluation and validation or also for machine learning methods.

In one specific embodiment, the classification comprises a comparison of the first observation with the second observation and/or the third observation.

In one specific embodiment, the ascertainment comprises a step of classification or a regression analysis, the classification or the regression analysis comprising a type classification of the formed label object and/or a state classification of the formed label object or a regression analysis of the state of the formed label object. The type classification is sometimes also referred to as an "object type classification." The type classification may comprise for example attributes such as "house," "vehicle," "yellow," "reflecting," etc. The state classification is sometimes also referred to as an "state type classification." The state classification may comprise, e.g., attributes such as "static" or "dynamic." Additional kinds of classification of the observation may also be used.

In one specific embodiment, the state classification comprises a classification of the label object as a static label object or as a dynamic label object. The static label object may be, e.g., a house, a guardrail or a parked vehicle. The dynamic label object may be, e.g., a moving bicycle or a moving vehicle. The state classification may be performed using a plurality of methods. One of these methods may be for example a difference analysis, e.g., between the first, the second and the third observation, or model-based processing. For this purpose, by way of the difference analysis of associated measurement or by way of the model-based processing, the labeling system classifies the observation as a static label object if no change of location is analyzed. The labeling system classifies an observation as a dynamic label object, e.g., if the difference analysis analyses a change of location, i.e., if the change of location of the sensor measurement was not caused exclusively by the movement of the mobile ego device. A static label object may experience an update of the classification. Thus, e.g., a parked vehicle, which was classified as a static label object, may move; in this case the same vehicle is reclassified as a dynamic label object. If a vehicle, which was classified as a dynamic label object, is at a standstill, however, it remains a dynamic label object, but with the attribute "velocity=zero."

The labeling system classifies the label object as an interfering object if the difference analysis analyzes a disappearance or unjustified appearance of the stored object. The interfering object may be for example a temporary artifact (also called "ghost"), for which there is no correspondence in the real world. The classification as a static, dynamic or clutter label object forms a part of the attributes of the label object.

In one specific embodiment, the labeling system is furthermore designed to analyze the sequence of labels (object attributes) and/or observations by way of another difference analysis and/or to generate associations of observations regarding objects represented by labels. The associations of measurements to objects may also be added in the form of further labels to the labeled sample, which is generated automatically from the unlabeled sample. The further difference analysis and/or association generation may comprise a longer sequence of measurements and/or labels than the (first) difference analysis. The additional difference analysis/association may also profit from holistic processing in that the estimation of the attributes at a specific point in time and/or the associations at this point in time includes the sensor data before, at and after this point in time. The additional difference analysis or association may also be implemented as an iterative process. The iterative process is terminated when the values calculated in the iteration—e.g., for specific attributes—and/or the association of sensor measurements converge to objects represented by the labels. This may utilized for example in order to generate at first multiple possible hypotheses in the event of ambiguities in the observations, which are weighed against one another and determined as plausible or implausible in subsequent processing steps. This may improve the accuracy of the conversion of the measured data into a labeled sample. In one specific embodiment, the iterative process for estimating object attributes for a specific point in time may use sensor data before, at or after this point in time, i.e., holistic processing may be performed. In one specific embodiment (e.g., of offline processing), the iterative process does not have to fulfill real time conditions and may therefore be comparatively time-intensive and computation-intensive. The iterative process may be performed for example on a server or another particularly powerful processor system. The results of the iterative process may subsequently be provided to a processor system in a mobile device, which has—at least in some cases—less computing power.

In one specific embodiment, the classification comprises the use of a model. For this purpose, it is possible to use models for the type classification and/or for the state classification. Thus, it is possible for example to use models for a house or a vehicle. It is also possible to use movement models that interact with one another, e.g., a so-called interacting multiple model (IMM). The model may be a model trained on the basis of training data. The training data in this case represent a sample of recorded and labeled sensor data. The model may, for example, represent the conditional statistical distribution of the sensor data or the conditional statistical distribution of features extracted from the sensor data as a function of the type or state to be classified or to be determined by regression analysis. The conditional distribution is estimated from the training data.

In one specific embodiment, the classification comprises the use of an artificial neural network. For this purpose, the artificial neural network is trained using a series of classified label objects, e.g., using various types of moving and non-moving vehicles, pedestrians, houses, guardrails, etc. The accuracy of the classified label objects subsequently may be further improved using additional methods.

In one specific embodiment, the classification comprises the use of a Bayesian filter, e.g., of a Kalman filter. The Bayesian filter or the Kalman filter may be used, e.g., for estimating the object attributes. This makes it possible to reduce in particular errors that manifest themselves in an erratic dynamics in the sequence of sensor measurements. To increase the accuracy of the description of the behavior over time further, it is possible to use movement models that interact with one another, e.g., a so-called interacting multiple model (IMM).

In one specific embodiment, the classification or the regression analysis comprises the use of a Bayesian smoother, in particular a fixed interval Bayesian smoother. In one specific embodiment, a Rauch-Tung-Striebel (RTS) filter may be used for estimating the object attributes. The system is thus able to profit from a higher estimation accuracy due to the holistic processing because in this case the estimate of the attributes applicable for a specific point in time incorporates measurements before, at and after this point in time.

In one specific embodiment, the classification comprises the use of a graph-based optimization. In this case, the nodes of the graph represent object attributes (labels) and its edges represent observations and physical restrictions or movement models of the dynamic objects. The graph defines an error function, which depends on the measurement data, the object attributes, the sensor models and the movement models. The composite error of the graph, which results from the sum of the errors per edge, is minimized by an iterative optimization in that the optimal solution is found in the nodes in the state space of the object attributes. This is a holistic optimization because every measurement value incorporated in a graph is able to affect all of the parameters (attributes) of the graph that are to be optimized.

In one specific embodiment, the classification and/or the regression analysis comprises the following steps:
  generating a provisional static label object, a provisional dynamic label object or a provisional clutter label object;
  associating an observation with a provisional label object and on this basis determining that the measurement at the basis of the observation is a static measurement, a dynamic measurement, or a clutter measurement;
  refining the types and attributes of the provisional static and/or dynamic label objects on the basis of the respectively associated observations;
  evaluating the provisional static label object or the provisional dynamic label object on the basis of a goodness measure and/or quality measure;
  in response to the goodness measure and/or quality measure falling below a specified threshold value, branching back to the step of associating;
  in response to the goodness measure and/or the quality measure reaching or exceeding the specified threshold value, generating a final label object by using the provisional static label object or the provisional dynamic label object.

It is also possible to perform these steps iteratively using a number of iterations. The number of iterations may be determined as a predefined number. The number of iterations, or the end of the iterative method, may be defined by an abort criterion. The abort criterion may be derived, e.g., from a quality criterion, e.g. from a distance estimate of an object if a first distance estimate yields a deviation of less than 30 cm with respect to a second distance estimate.

In one specific embodiment, the use of the first observation comprises a comparison of the first observation with a list of example objects. In this instance, when processing the sensor measurements, the labeling module is able to access example objects, e.g., models, which are stored in a model memory. The models may be sensor modality-specific models, that is, there may be a model for the processing or detection of the camera images and an independent model for the processing or detection of the radar measurement values, for example. In addition, there may be models for the amalgamation of the sensor data. There may also be models for describing the behavior of dynamic objects over time and thereby to enable or improve the tracking of the objects (movement models). The models may be models generated on the basis of training data, or manually defined models having parameters defined on the basis of physical relationships or parameters optimized on the basis of experiential values. The automatically trained models may be models trained using artificial neural networks, for example so-called deep neural networks. Using a list of example objects makes it possible, e.g., to add to the attributes of the label object further attributes, for example attributes of the type classification.

A further aspect of the present invention relates to a labeling system for generating a label object, which comprises at least one attribute of an object at a first point in time, from observations of this object, the labeling system including:

a memory, which is designed to store the observations, the observations comprising:

a first observation recorded at the first point in time, a second observation recorded at a second point in time, the second point in time being a point in time prior to the first point in time, and a third observation recorded at a third point in time, the third point in time being a point in time after the first point in time;

a labeling module, which is designed to ascertain the at least one attribute of the object by using the selected observations.

In one specific embodiment, each of the observations is made up of individual observations, and these individual observations are respectively made using different contrast mechanisms.

In one specific embodiment, each of the observations is made up of individual observations, and these individual observations are respectively made using the same contrast mechanism and using sensors of different qualitative value.

In one specific embodiment, the individual observations are amalgamated to form the observations before these observations in turn are used for ascertaining the attribute of the object.

In one specific embodiment, the ascertainment comprises a step of classification or a regression analysis, the classification or the regression analysis comprising a type classification of the formed label object and/or a state classification of the formed label object or a regression analysis of the state of the formed label object.

In one specific embodiment, the state classification comprises a classification of the label object as a static label object or as a dynamic label object.

In one specific embodiment, the classification comprises a comparison of the first observation with the second observation and/or the third observation.

In one specific embodiment, the classification or the regression analysis comprises the use of a model, and/or the use of an artificial neural network, and/or the use of a Bayesian filter, and/or the use of a Bayesian smoother, and or the use of a graph-based optimization.

In one specific embodiment, the memory is situated in the mobile device, that is, for example within the robot or the vehicle and/or connected to the robot or the vehicle, and the labeling module is situated on a server outside of the mobile device. The lists for models and object attributes may also be situated on a server outside of the mobile device. Thus, in this specific embodiment, the sensor data measured in the mobile device may be stored on a persistent storage medium during the drive and may be transferred onto a server computer or onto a server cluster outside of the mobile device after the conclusion of the drive. The labels are generated on this server computer or server cluster. For this purpose, the labeling system is able to use server hardware that has a higher performance that the hardware that is usually available in a mobile device. This allows for the use of algorithms, which cannot be used in a mobile device due to the demands on computing power and storage capacity, and which therefore achieve a greater accuracy and reliability of the generated labels. This makes it possible, among other things, to use also machine learning methods, which generate, on the basis of a modality or a combination of different modalities and by holistic processing of the sensor data, additional information, which is taken into account for increasing the accuracy for the automatic generation of the reference labels, or which generate the reference labels directly.

In one specific embodiment, the memory is situated in a cloud and the labeling module is located on a server outside of the mobile device. The list of the model parameters and object attributes may also be located on a server outside of the mobile device. The sensor data measured in the mobile device may be transferred during the drive, e.g., via a wireless Internet connection onto a server computer or onto a server cluster outside of the mobile device. The labels are generated on this server computer, a server cluster or in a cloud.

In one specific embodiment, the memory and the labeling module are located in the mobile device. The memory and the lists may also be located in the mobile device. In one specific embodiment, the list in the mobile device contains a proper subset of the models on the server. For this purpose, in order to account for the—compared to a server—lower computing power and/or storage capacity of processor systems as they are often used in mobile devices, a selection of the measured data is made so that reference labels are automatically generated only for a portion of the measured data.

Another aspect of the present invention relates to a robot or a vehicle, in particular a vehicle driving in at least partially automated fashion, having a labeling system as is described above and/or below.

Another aspect of the present invention comprises a program element, which is designed to implement one of the mentioned methods when it is executed in a processor unit.

Another aspect of the present invention comprises a computer-readable medium on which the mentioned program element is stored.

Another aspect of the present invention relates to a use of a labeling system as described above for generating a labeled sample, in particular for use for the development of a vehicle that drives at least partially in automated fashion.

Further measures improving the present invention are presented in greater detail below with reference to the figures together with the description of preferred exemplary embodiments of the present invention.

DETAILED DESCRIPTION OF EXAMPLE EMBODIMENTS

Figure 1:
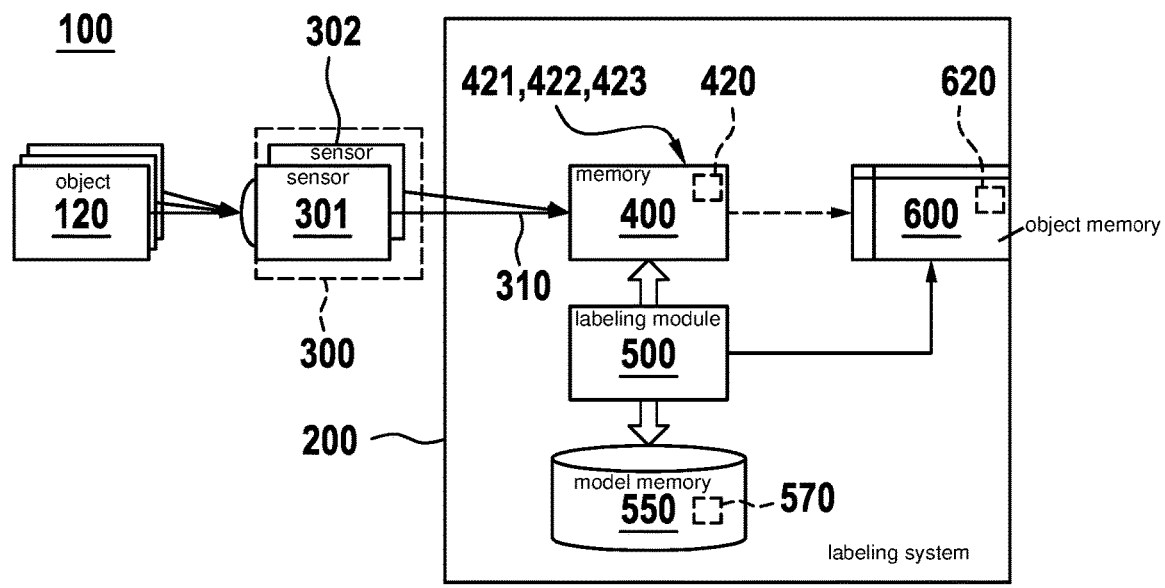
FIG. 1 schematically shows a system according to one specific embodiment of the present invention.

FIG. 1 schematically shows a system including a labeling system 200 according to a specific embodiment of the present invention. The labeling system 200 is connected to a sensor set 300, which has a plurality of individual sensors 301, 302. Individual sensors 301, 302 may have or use various contrast mechanisms. In the specific embodiment shown, a first individual sensor 301 is developed as a camera (schematically indicated by a lens) and the second individual sensor 302 is developed as a radar sensor; the second individual sensor 302 thus being of a different sensor type than individual sensor 301 and using different contrast mechanisms. Sensor set 300 is designed to detect raw measurement values of an object 120 in an environment or a surroundings 100 and to transmit these via the line or interface 310 to a memory 400. The type of raw measurement values is specific to the sensor; these may be for example pixel values, positional data (e.g., radar locations) or also specific attributes of an object (e.g., a velocity component) etc. In general, not only measurement values of the objects are generated, but also background measurements (e.g., background pixels in the image) or false positive measurements (e.g., ghost locations of the radar sensor). Object 120 may be an object or—as shown here—also multiple objects. Sensor set 300 records each of the objects 120 multiple times, e.g., in an equidistant time sequence, at a first point in time t1, at a second point in time t2 and at a third point in time t3. Measurements of objects 120 as well as background and false positive measurements are then stored in a memory 400 as an observation 420 or as a sequence of observations 420. An observation 420 has a first recorded observation 421, which is recorded at first point in time t1, as second recorded observation 421, which is recorded at second point in time t2, and a third recorded observation 423, which is recorded at third point in time t3.

Figure 2:
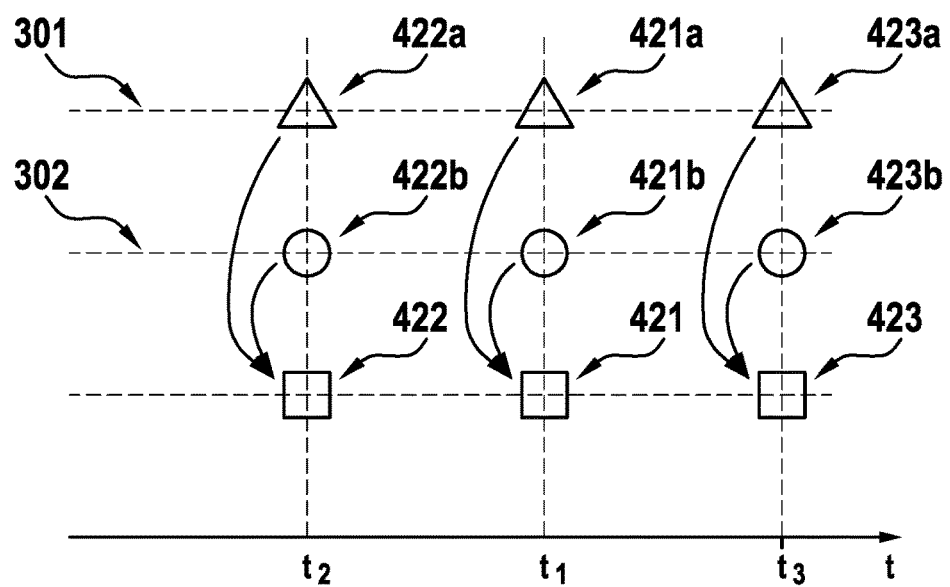
FIG. 2 schematically shows a timing diagram for recording the individual observations according to one specific embodiment of the present invention.

Labeling system 200 furthermore has a labeling module 500. The latter transforms sensor observations 420 into sequences of labels 620, labeling module 500 processing the observations 420 using holistic algorithms in order to generate the labels 620. In processing the observations 420, labeling module 500 accesses models 570, which are stored in a model memory 550. The models may be sensor modality-specific models, that is, there may be, for example, a model for the processing or detection of the camera images and an independent model for the processing or detection of the radar measurement values. In addition, there may be models for the amalgamation of the sensor data. There may also be models for describing the behavior of dynamic objects over time and thereby to enable or improve the tracking of the objects (movement models). The models may be models generated on the basis of training data, or manually defined models having parameters defined on the basis of physical relationships or parameters optimized on the basis of experiential values. The automatically trained models may be models trained using artificial neural networks, for example deep neural networks. FIG. 2 schematically shows, along a time axis indicated by t, a time diagram for the recording of individual observations according to one specific embodiment of the present invention. The individual observations are recorded by individual sensors 301 and 302 (see FIG. 1) at points in time t1, t2, t3. Individual sensors 301, 302 may have or use various contrast mechanisms. Thus, at a first point in time t1, first individual sensor 301 may record an individual observation 421a. First individual sensor 301 may use a first contrast mechanism in order to record individual observation 421a, which is indicated by a triangle. The first point in time may be, e.g., the real present time. The first point in time may also be, particularly in offline processing, a point in time that is prior to the real present time and that was stored, e.g., in the form of a file. The first point in time may be in this case defined as a reference point in time—so to speak as the "present time for this measurement," i.e., during the detection of the object. At first point in time t1, second individual sensor 302 also records an individual observation 421b. For this purpose, second individual sensor 302 may use a second contrast mechanism in order to record individual observation 421a, which is indicated by a circle. Individual observations 421a and 421b may then be combined, in particular amalgamated, into an observation 421. The combined observation 421 is represented by a rectangle. First individual sensor 301 and second individual sensor 302 furthermore record an individual observation 422a or 422b at a second point in time t2. Second point in time t2 lies in the past with respect to first point in time t1. Individual observations 422a and 422b may then be combined, e.g., amalgamated, into one observation 422. First individual sensor 301 and second individual sensor 302 furthermore record individual observations 423a and 423b at a third point in time t3. Third point in time t3 lies in the future with respect to first point in time t1. In the case of offline processing, third point in time t3 may be a later point in time of recording in comparison to the first point in time. In the case of online processing, the detection may include a prediction at the third point in time. The third point in time may be removed from the first point in time by the same time interval as the second point in time.

Individual observations 423a and 423b may be combined, e.g., amalgamated, into one observation 423.

Figure 3:
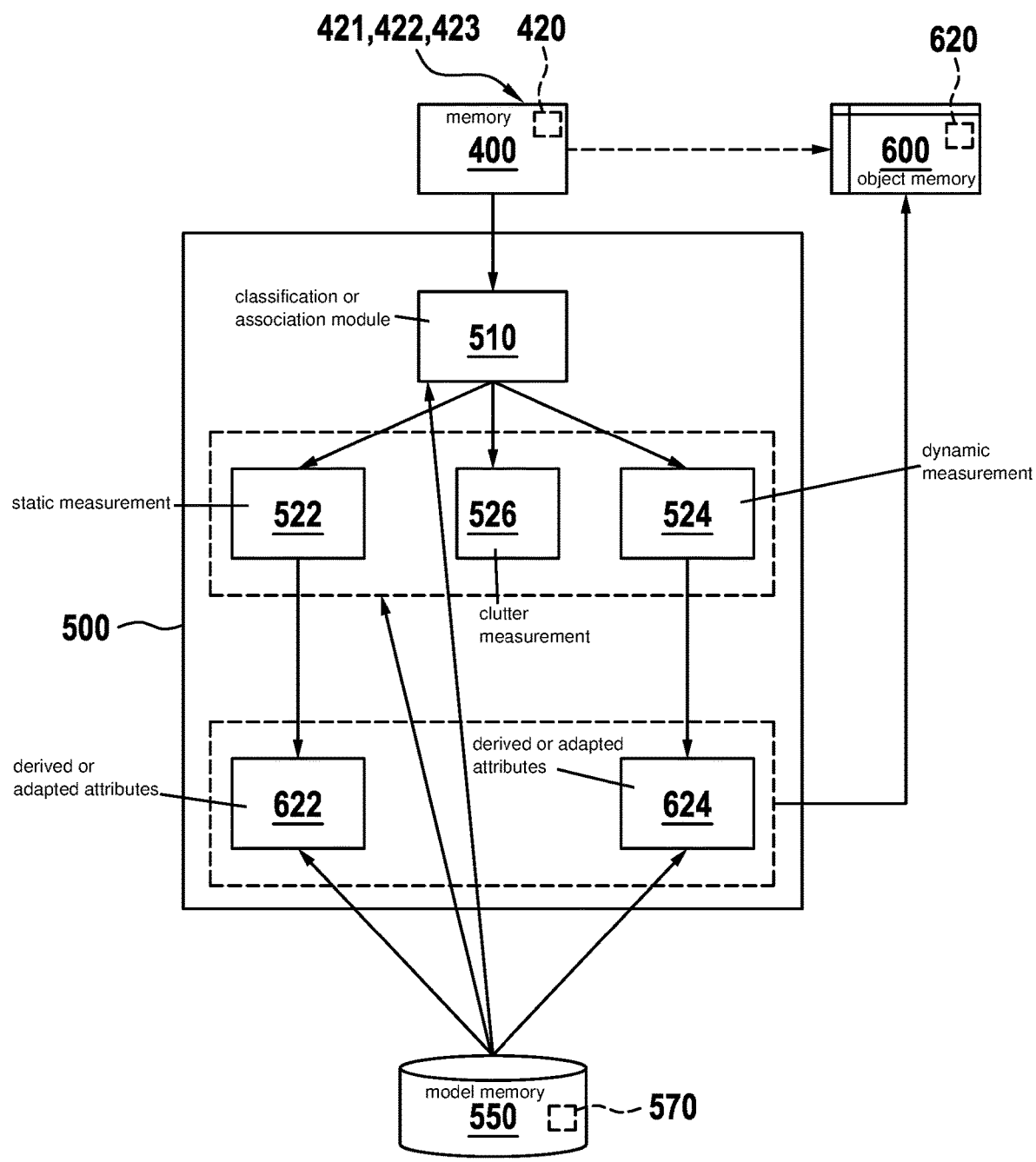
FIG. 3 schematically shows a portion of a labeling system according to a specific embodiment of the present invention.

FIG. 3 schematically shows a portion of labeling system 200 according to a specific embodiment of the present invention. A classification or association module 510 is shown, which classifies a sensor observation 420—which includes observations 421, 422 and 423—from memory 400 as static measurement 522, and/or as dynamic measurement 524 and/or as clutter measurement (false positive measurement) 526. This may occur for example by way of a difference analysis of sensor observation 420 against the attributes of objects—previously produced by "spawning" and, in the case of dynamic object, followed by "tracking", whose attributes are represented by labels 620. The result of the difference analysis is the association with existing objects, from which the classification as static, dynamic or "clutter" is derived. In the case of some sensor modalities, this classification may also occur partially directly on the basis of measured attributes (for example velocity in the case of radar), or this classification may be performed by a model-based classifier trained on training data (e.g., by neural networks). If the difference analysis yields an association of sensor observation 420 with a static object or if the model-based classification concludes that sensor observation 420 stems from a static object, then observation 420 is classified as a static measurement 522. No change in location means, e.g., in a non-moving mobile device that sensor observation 420 in the sequence of at least two elements is subject to a change only due to sensor noise or changed conditions in the surroundings; in a moving mobile device, the movement may be calculated from the at least two elements. Some labeling systems 200 use a Kalman filter in the difference analysis, which improves the analysis particularly in the case of a moving vehicle. Observation 522 is the sensor observation 420 classified as a static measurement. Observation 524, by contrast, is the observation 420 classified as a dynamic measurement. Finally, observation 526 is the observation 420 classified as clutter or a clutter label object. Reference numeral 622 designates attributes derived from measurements or adapted copies of previously derived attributes (e.g., position, size) of a static object, whose attributes are stored in object memory 600, and reference numeral 624 designates derived or adapted attributes (e.g., velocity) of a dynamic object, whose attributes are stored in object memory 600. Final object attributes 620 are set by taking into consideration all of the attributes 622 and 624, respectively, set or adapted over time. 622 and 624 are thus the holistically optimized attributes. The attributes 622 and 624 are set or adapted by respectively taking into consideration observation 522 and 524. In the case of some sensor modalities (for example radar), each observation 420 (for example radar locations) is classified either as a static measurement 522 or as a clutter measurement 526 or as a dynamic measurement 524. In this case, an observation 420 is identical with one of measurements 522, 526 or 524, while the other two measurements do not exist for this observation. In the case of other sensor modalities (for example camera), multiple processed measurements 522 and 524 may result from one observation 420 (for example the image of a camera). In this case, 522 and 524 are also designated as features. In the example of a camera image, 522 may be segmented static objects in the image for example, while 524 may be segmented dynamic objects in the image.

If a classification of observations 420 occurs as static, dynamic or clutter, models 570 may be used, which are stored in a model memory 550. If processed measurements or features 522, 526 and/or 524 are alternatively (as a function of the sensor modality) generated from observations 420, typically models 570 are likewise used, which are stored in a model memory 550 (see also FIG. 1).

Figure 4:
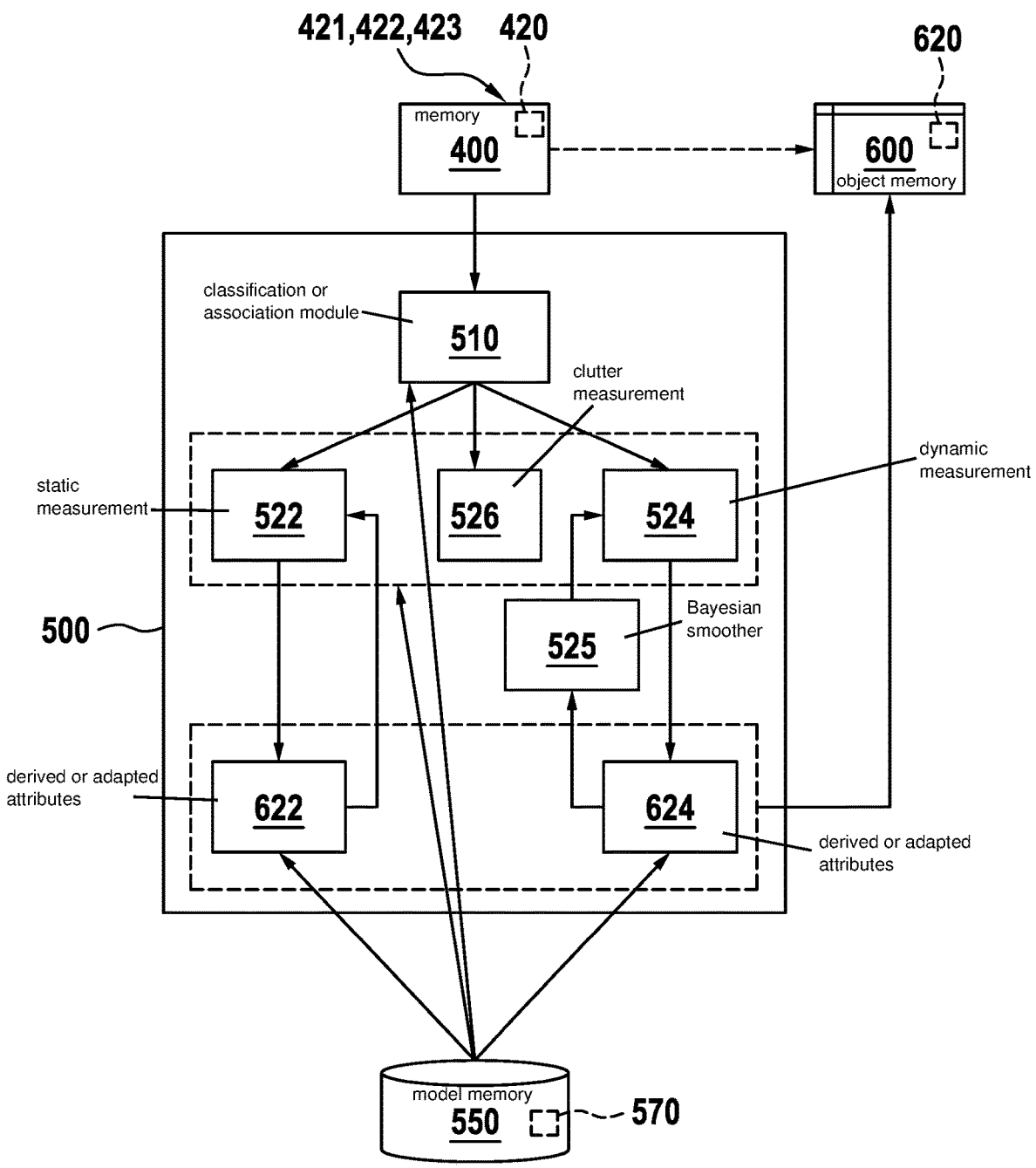
FIG. 4 schematically shows a portion of a labeling system according to another specific embodiment of the present invention.

FIG. 4 schematically shows a portion of labeling system 200 according to another specific embodiment of the present invention. FIG. 4 largely coincides with FIG. 3; the same reference numerals designating identical components. FIG. 4 differs from FIG. 3 in that an iterative process is implemented for ascertaining the static attributes 622 and the dynamic attributes 624. The iterative process takes into account a longer sequence of observations 420 than the classification/association module 510. In a sequence of dynamic attributes 624, a Bayesian smoother 525, e.g., a Rauch-Tung-Striebel filter (RTS filter), is additionally used.

Figure 5:
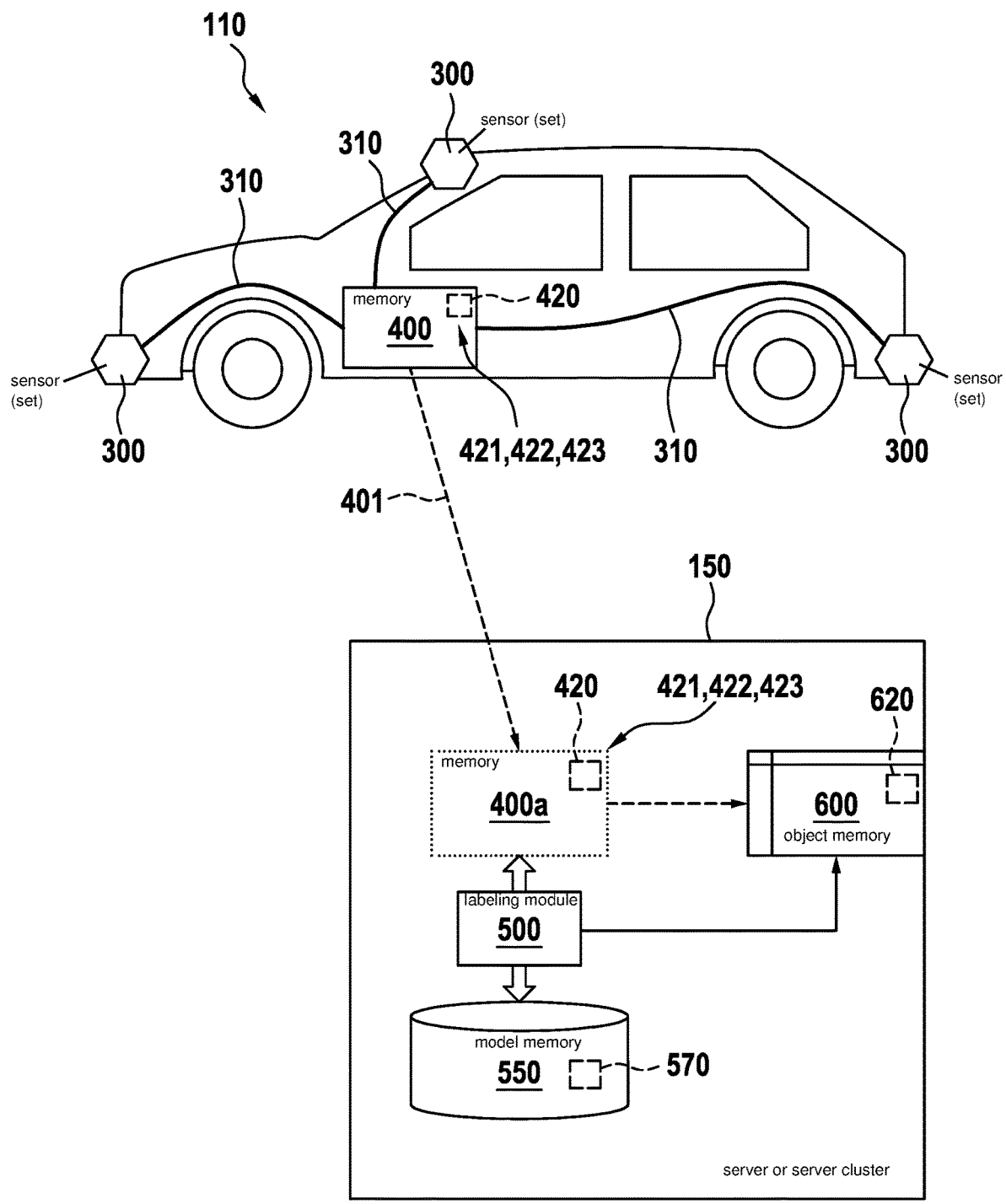
FIG. 5 schematically shows a constellation of a system according to a specific embodiment of the present invention.

FIG. 5 schematically shows a constellation of a system according to a specific embodiment of the present invention. In this instance, the observations or sensor data 420 measured in vehicle 110 are stored during the drive on a persistent storage medium 400. Following the conclusion of the drive, the sensor data 420 are copied via the transmission route 401 onto a memory 400a on a server computer or server cluster 150 outside of vehicle 110. The server computer or server cluster 150 may also be implemented as a cloud. Subsequently, the analysis of the data and the generation of the labels 620 takes place on server 150 as described above.

Figure 6:
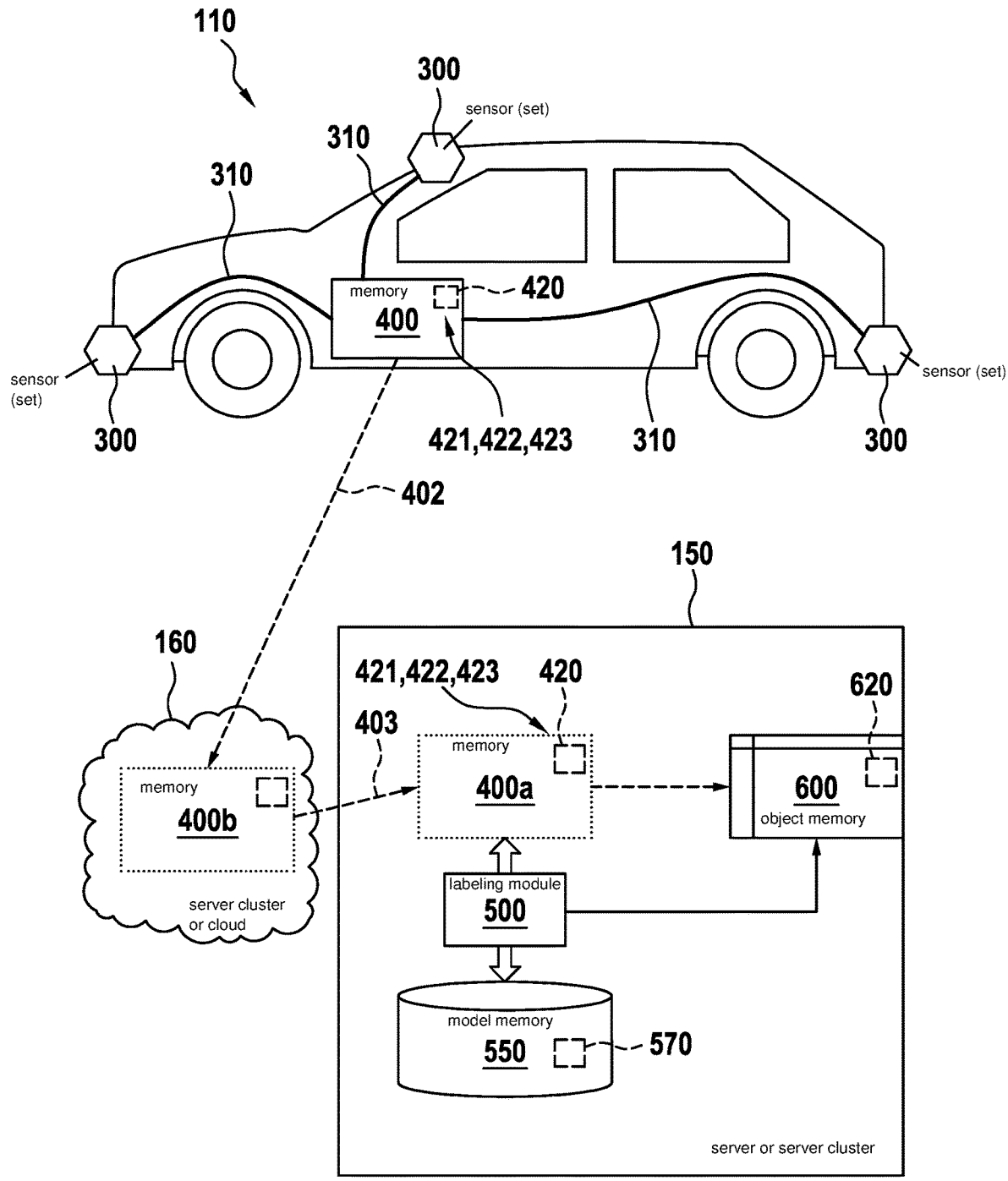
FIG. 6 schematically shows another constellation of a system according to a specific embodiment of the present invention.

FIG. 6 schematically shows another constellation of a system according to another specific embodiment of the present invention. In this instance, the sensor data measured in the vehicle during the drive are copied via a wireless Internet connection 402—or via another transmission path—onto a memory 400b in a server cluster or cloud 160 outside of the vehicle 110. Subsequently, the data are copied from there via transmission route 403 into memory 400a on server 150. The analysis of the data and the generation of the labels 620 are then performed on server 150, as described above. Alternatively, the analysis of the data and the generation of the labels may occur directly on a server cluster in cloud 160 so that the step of copying to memory 400a via transmission route 403 is eliminated.

Figure 7:
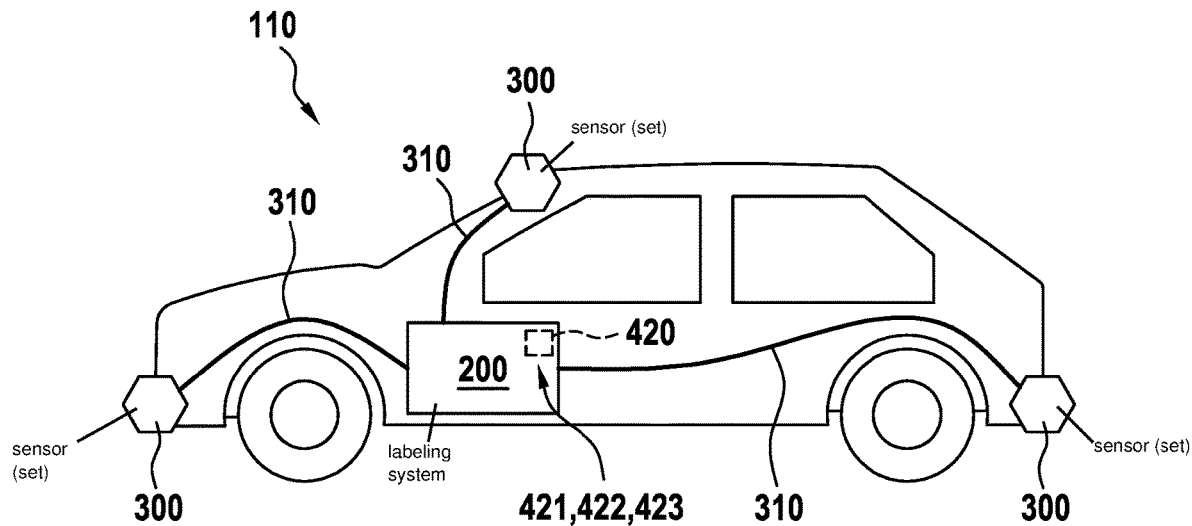
FIG. 7 schematically shows another constellation of a system according to a specific embodiment of the present invention.

FIG. 7 schematically shows another constellation of a system according to a specific embodiment of the present invention. In this instance, the sensor data 420 measured in vehicle 110 are processed in vehicle 110 itself, using labeling system 200. Sensor data 420 may be detected, e.g., using three sensors 300, which are placed at different positions of vehicle 110, and may be stored as a sequence of observations 420 in a memory 400. Labeling system 200 has the components described in FIG. 3 or FIG. 4. It is possible, however, e.g., for reasons of weight, volume and/or power consumption, to design in particular the memories for model parameters for example to be smaller and for the processor system to be less powerful.

Figure 8:
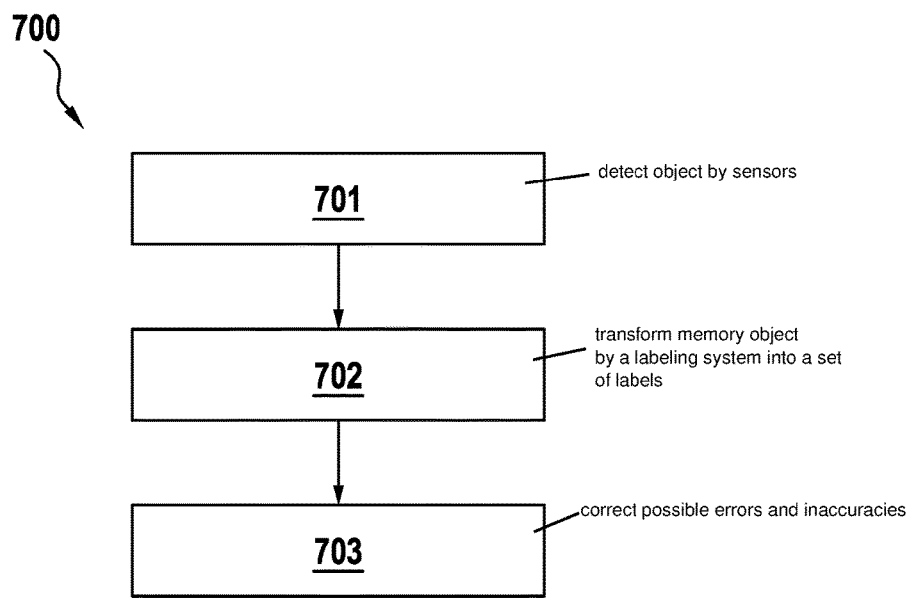
FIG. 8 shows a method according to a specific embodiment of the present invention.

FIG. 8 shows a method according to one specific embodiment of the present invention. In a step 701, an object 120 (see FIG. 1) is detected by three sensors 300, which may be placed at different positions of vehicle 110 (e.g., as shown in FIG. 7), and is stored as a sequence of observations 420 in a memory 400. In a step 702, the memory object 420, is transformed by a labeling system 200 into a set of labels 620 and stored in label memory 600. The sequence of sensor observations is called an unlabeled sample. The combination of the sequence of sensor observations having the generated labels is called a labeled sample. As a function of the required accuracy and reliability of the labels and as a function of the accuracy achievable by the utilized sensors of the sensor set and of the algorithms of the labeling system, labels 620 may be improved in a further step 703, in that human editors manually correct possible errors and inaccuracies of the labels using a suitable tool for representing and visualizing the raw sensor data and the generated labels, in order to produce an improved version of the set of labels. For this purpose, the representation tool is able to support the change of the labels in accordance with the input of the human editors.

What is claimed is:

1. A method for generating a label object which includes at least one attribute of an object at a first point in time, from observations of the object, comprising the following steps:
    selecting, from the observations of the object, a first observation recorded at the first point in time, a second observation recorded at a second point in time, the second point in time being a point in time prior to the first point in time, and a third observation recorded at a third point in time, the third point in time being a point in time after the first point in time;
    ascertaining, using the selected observations, the at least one attribute of the object;
    wherein the ascertaining includes classifying the selected observations by selecting a classification from amongst a plurality of classifications, the selecting being made based on a difference analysis of the selected observations, the plurality of classifications including a static measurement classification, a dynamic measurement classification, and a clutter measurement classification, the static measurement classification being selected when the difference analysis analyzes, based on the selected observations, no change in location of the object, the dynamic measurement classification being selected when the difference analysis analyzes, based on the selected observations, a change in location of the object, and the clutter measurement classification being selected when the difference analysis analyzes, based on the selected observations, a false positive detection of the object.

2. The method as recited in claim 1, wherein: (i) each of the observations is composed of individual observations and the individual observations are respectively recorded using different contrast mechanisms, and/or (ii) each of the observations is composed of individual observations and the individual observations are respectively recorded using the same contrast mechanisms and using sensors of different qualitative value.

3. The method as recited in claim 2, wherein the individual observations are respectively amalgamated to form the observations before the observations in turn are used for ascertaining the attribute of the object.

4. The method as recited in claim 1, wherein the ascertaining includes a step of classification or a regression analysis, the classification or the regression analysis including: (i) a type classification of the generated label object and/or a state classification of the generated label object, or (ii) a regression analysis of a state of the generated label object.

5. The method as recited in claim 4, wherein: (i) the classification includes a comparison of the first observation with the second observation and/or the third observation, and/or (ii) the state classification includes a classification of the label object as a static label object or as a dynamic label object, and/or (iii) the classification includes use of a model, and/or (iv) the classification includes use of an artificial neural network, and/or (v) the classification includes use of a Bayesian filter, and/or (vi) the classification or the regression analysis includes use of a Bayesian smoother, and/or (vii) the classification or the regression analysis includes use of a graph-based optimization.

6. The method as recited in claim 4, wherein the classification and/or the regression analysis comprises the following steps:
    generating a provisional static label object, or a provisional dynamic label object, or a provisional clutter label object;
    associating each of the observations with a provisional label object and based on the associating, determining that a measurement at the basis of the observation is a static measurement, or a dynamic measurement, or a clutter measurement;
    refining types and attributes of the provisional static label object and/or the provisional dynamic label object based the respectively associated observations;
    evaluating the provisional static label object or the provisional dynamic label object based on a goodness measure and/or quality measure;
    in response to the goodness measure and/or quality measure falling below a specified threshold value, branching back to the step of associating; and
    in response to the goodness measure and/or the quality measure reaching or exceeding the specified threshold value, generating a final label object using the provisional static label object or the provisional dynamic label object.

7. The method as recited in claim 1, wherein the use of the first observation includes comparing of the first observation with a list of example objects.

8. The method as recited in claim 1, wherein the third observation recorded at the third point in time is a predicted observation for the third point in time.

9. The method as recited in claim 1, wherein each of the observations is amalgamation of individual observations of the object by different sensors.

10. A labeling system for generating a label object, which includes at least one attribute of an object at a first point in time, from observations of the object, the labeling system comprising:
    a memory configured to store the observations, the observations including a first observation recorded at the first point in time, a second observation recorded at a second point in time, the second point in time being a point in time prior to the first point in time, and a third observation recorded at a third point in time, the third point in time being a point in time after the first point in time; and
    a labeling module configured to ascertain the at least one attribute of the object using the selected observations, wherein form the ascertainment of the at least one attribute, the labeling module is configured to:
        classify the selected observations by selecting a classification from amongst a plurality of classifications, the selecting being made based on a difference analysis of the selected observations, the plurality of classifications including a static measurement classification, a dynamic measurement classification, and a clutter measurement classification, the static measurement classification being selected when the difference analysis analyzes, based on the selected observations, no change in location of the object, the dynamic measurement classification being selected when the difference analysis analyzes, based on the selected observations, a change in location of the object, and the clutter measurement classification being selected when the difference analysis analyzes, based on the selected observations, a false positive detection of the object.

11. The labeling system as recited in claim 10, wherein: (i) each of the observations is composed of individual observations and the individual observations are respectively recorded using different contrast mechanisms, and/or (ii) each of the observations is composed of individual observations and the individual observations are respectively recorded using the same contrast mechanisms and using sensors of different qualitative value.

12. The labeling system as recited in claim 11, wherein the individual observations are respectively amalgamated to form the observations before the observations in turn are used for ascertaining the attribute of the object.

13. The labeling system as recited in claim 10, wherein the ascertainment by the labeling module includes a step of classification or a regression analysis, the classification or the regression analysis comprising: (i) a type classification of the generated label object, and/or a state classification of the generated label object, or (ii) a regression analysis of a state of the generated label object.

14. The labeling system as recited in claim 13, wherein: (i) the state classification includes a classification of the label object as a static label object or as a dynamic label object, and/or (ii) the classification or the regression analysis includes a comparison of the first observation with the second observation and/or the third observation, and/or (iii) the classification or the regression analysis includes use of a model, and/or (iv) the classification or the regression analysis includes use of an artificial neural network, and/or (v) the classification or the regression analysis includes use of a Bayesian filter, and/or (vi) the classification or the regression analysis includes use of a Bayesian smoother, and/or (vii) the classification or the regression analysis includes use of a graph-based optimization.

15. The labeling system as recited in claim 10, further comprising:
a memory in which the observations are stored, wherein: (i) the memory is situated in a vehicle and the labeling module is situated on a server outside of the vehicle, and/or (ii) the memory is situated in a cloud and the labeling module is situated on a server outside of the vehicle, and/or (iii) the memory and the labeling module are situated in the vehicle.

16. The labeling system as recited in claim 10, wherein the third observation recorded at the third point in time is a predicted observation for the third point in time.

17. The labeling system as recited in claim 10, wherein each of the observations is amalgamation of individual observations of the object by different sensors.

18. A non-transitory computer-readable medium on which is stored a computer program for generating a label object which includes at least one attribute of an object at a first point in time, from observations of the object, the computer program, when executed by a computer, causing the computer to perform the following steps:
selecting, from the observations, a first observation recorded at the first point in time, a second observation recorded at a second point in time, the second point in time being a point in time prior to the first point in time, and a third observation recorded at a third point in time, the third point in time being a point in time after the first point in time;
ascertaining, using the selected observations, the at least one attribute of the object;
wherein the ascertaining includes classifying the selected observations by selecting a classification from amongst a plurality of classifications, the selecting being made based on a difference analysis of the selected observations, the plurality of classifications including a static measurement classification, a dynamic measurement classification, and a clutter measurement classification, the static measurement classification being selected when the difference analysis analyzes, based on the selected observations, no change in location of the object, the dynamic measurement classification being selected when the difference analysis analyzes, based on the selected observations, a change in location of the object, and the clutter measurement classification being selected when the difference analysis analyzes, based on the selected observations, a false positive detection of the object.

19. A method, comprising the following steps:
providing a labeling system for generating a label object, which includes at least one attribute of an object at a first point in time, from observations of the object, the labeling system including a memory configured to store the observations, the observations including a first observation recorded at the first point in time, a second observation recorded at a second point in time, the second point in time being a point in time prior to the first point in time, and a third observation recorded at a third point in time, the third point in time being a point in time after the first point in time, and the labeling system further including a labeling module configured to ascertain the at least one attribute of the object using the selected observations, wherein form the ascertainment of the at least one attribute, the labeling module is configured to classify the selected observations by selecting a classification from amongst a plurality of classifications, the selecting being made based on a difference analysis of the selected observations, the plurality of classifications including a static measurement classification, a dynamic measurement classification, and a clutter measurement classification, the static measurement classification being selected when the difference analysis analyzes, based on the selected observations, no change in location of the object, the dynamic measurement classification being selected when the difference analysis analyzes, based on the selected observations, a change in location of the object, and the clutter measurement classification being selected when the difference analysis analyzes, based on the selected observations, a false positive detection of the object; and
using the labeling system to develop a vehicle driving at least partially in automated fashion.

* * * * *